United States Patent Office 3,660,524
Patented May 2, 1972

3,660,524
MOLD ARTICLES AND COATING BASED ON ORGANOPOLYSILOXANES
Ignaz Bauer, Rudolf Riedle, and Siegfried Nitzsche, Burghausen, Upper Bavaria, Germany, assignors to Wacker-Chemie G.m.b.H., Munich, Germany
No Drawing. Original application Feb. 7, 1968, Ser. No. 703,549, now Patent No. 3,578,490, dated May 11, 1971. Divided and this application Aug. 5, 1970, Ser. No. 61,513
Claims priority, application Germany, Nov. 15, 1967, W 45,165
Int. Cl. C08g 47/04, 47/10, 31/30
U.S. Cl. 260—825
4 Claims

ABSTRACT OF THE DISCLOSURE

A method for preparing organosiloxane resin coatings and molded articles consists of admixing a siloxane resin containing at least one alkenyl or cycloalkenyl group per 10 silicon atoms with an organoaminosilane or organoaminosilazane and a peroxide curing agent and heating the mixture to the range from 100° to 220° C. for 1 to 24 hours to secure a tack-free product.

---

This application is a divisional of application Ser. No. 703,549, filed Feb. 7, 1968, which application claimed priority under Title 35, United States Code, Section 119, from German application W 45,165, filed Nov. 15, 1967 (now U.S. Patent No. 3,578,490 issued May 11, 1971).

This invention is directed to a novel method for reducing or preventing the tacky surface characteristics encountered in molded articles and castings prepared from alkenylsiloxanes cured with organic peroxides.

Organopolysiloxane resin based materials based on siloxane polymers which harden and/or cure to form non-elastomeric products have been well known and widely employed particularly as moldings, castings and coatings. Such materials include formulations wherein the siloxane polmer contains at least one olefinically unsaturated radical bonded directly to silicon for each ten silicon atoms present and the curing catalyst is an organoperoxy compound.

Organosiloxane resins and resinous materials having a significant proportion of olefinically unsaturated radicals bonded to silicon in the molecule and cured with certain peroxy compounds have gained widespread use because they can be formulated and used in a solvent-free system (i.e. in the absence of organic solvent diluents). The mixtures in question can be prepared and remain stable for long periods of time during storage yet can be easily cured. Laminates and deep sections can be prepared therefrom without the use of pressure. Further, the molded articles and coatings prepared by curing these materials exhibit excellent mechanical properties such as high flexural strength. However, the cured molded and cast articles and coatings have been deficient in that any surface exposed to the atmosphere during the hardening and cure sequence remains tacky. This somewhat uncured, tacky surface collects dust and dirt which is unsightly and seriously reduces the electrical insulation properties of the cured resin.

It is the object of the present invention to introduce a novel organosiloxane resin system based on alkenylsiloxanes cured with peroxy compounds. A further object is a method for reducing or preventing the tacky surface encountered with cured moldings, castings and coatings of alkenylsiloxanes cured with peroxy compounds. Other objects and advantages of this invention are detailed in or will be apparent from the disclosure and claims which follow.

This invention introduces a method for preparing molded articles and coatings displaying non-tacky surfaces empolying mixtures consisting essentially of (1) organopolysiloxane based materials having a ratio of Si—C bonded olefinically unsaturated organic radicals to silicon atoms of at least 1/10 and (2) peroxy curing catalysts wherein there is applied to the surface of the molded article or coating an organosilicon compound having SiN groups.

The organosiloxanes having olefinically unsaturated organic radicals bonded to silicon can be any of those previously known for such use. Description of such siloxanes can be found in the art and particular reference is made to U.S. Pats. No. 2,897,221; No. 2,831,010; No. 2,906,766; No. 2,934,464; No. 3,137,665; No. 2,714,099; No. 2,894,930; and No. 2,915,497. The operable siloxane polymers preferably are substantially free of silicon bonded hydroxyl radicals. The polymers can be linear, branched or cyclic and can be represented by the general unit formula

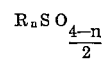

$$R_n SiO_{\frac{4-n}{2}}$$

wherein each R is a monovalent hydrocarbon radical, halogenated hydrocarbon radical or cyanoalkyl radical, at least one R per 10 silicon atoms being an olefinically unsaturated hydrocarbon radical, i.e. alkenyl or cycloalkenyl radicals, and $n$ has an average value in the range from 0.9 to 2.4.

Examples of olefinically unsaturated radicals are alkenyl radicals such as vinyl, allyl, hexenyl and octadecenyl and cycloalkenyl radicals such as cyclopentenyl, cyclohexenyl and cyclooctadecenyl radicals. Because of commercial availability and cost factors, the vinyl and allyl substituted siloxanes are preferred and vinylsiloxanes are most preferred. The ratio of olefinically unsaturated radicals to silicon atoms in the polymers is preferably in the range from 1/10 to 1/1. The balance of the R groups bonded to silicon can be alkyl radicals, aryl radicals, aralkyl radicals, alkaryl radicals, halogenated derivatives of the foregoing and cyanoalkyl radicals as these terms are known in the art and as exemplified by methyl, ethyl, n-propyl, isopropyl, n-butyl, sec. butyl, dodecyl, octadecyl, phenyl, xenyl, napthyl, phenanthryl, benzyl, beta-phenylethyl, xylly, tolyl, 3,3,3-trifluoropropyl, chloromethyl, bromoethyl, idophenyl, perchloroethyl and beta-cyanoethyl radicals. Because of commercial availability, the R radicals preferably contain not more than 30 carbon atoms per radical, more commonly 1 to 18 carbon atoms and the most preferred radicals free of olefinic unsaturation are methyl and phenyl radicals.

The organosiloxane polymers can be homopolymers or copolymers and can consist of any desired combination within the limits set forth above of units of the formula $SiO_{4/2}$, $RSiO_{3/2}$, $R_2SiO$, and/or $R_3SiO_{1/2}$. If desired, up to 50 percent of the oxygen atoms present as Si—O—Si linkage can be replaced by silcarbane linkages formed by divalent or polyvalent hydrocarbon radicals such as methylene, ethylene, and paraphenylene radicals. The operable siloxane polymers have viscosities measured at 25° C. in the range from about 5 cs. to 200,000 cs. with best results achieved in the range from 200 to 20,000 cs.

A preferred embodiment of the siloxane polymers employed herein are those polymers having a viscosity at 25° C. in the range from 200 to 20,000 cs. and consisting essentially of (a) 0.1 to 10 mol percent of triorganosilyl units ($R'sSiO_{1/2}$) wherein the organic substituents (R') are methyl or phenyl radicals, (b) 20 to 99 mol percent of diorganosiloxane units ($R''_2SiO$) wherein the organic substituents (R'') are vinyl, methyl, or phenyl radicals and, if desired, (c) up to 70 mol percent of monoorganosiloxane units ($R''SiO_{3/2}$) where the organic substituents are vinyl, methyl or phenyl radicals, at least 1 organic substituent per 10 silicon atoms being a vinyl radical. In each unit, the R' and R'' radicals can be the same or different.

The peroxy compounds employed in the method of this invention are those peroxy compounds described in the prior art for use with the alkenylsiloxane polymers described above and employed herein. Such peroxy compounds are known from and are listed, for example, in U.S. Pats. No. 2,934,464; No. 3,137,665; No. 2,714,099 and 2,894,930. Specific examples which can be mentioned herein are dicumyl peroxide, di-tert.-butyl peroxide, cumene hydroperoxide, 2,2-bis(tert.-butyl peroxide)butane, tert.-butylperlaurinate, tert.-butylperbenzoate, and tert.-butylhydroperoxide. These peroxy curing agents are employed in standard catalytic quantities, i.e. 0.1 to 10 percent by weight based on the weight of alkenylsiloxane polymer, preferably 0.5 to 3.0 percent by weight and most preferably 1.5 to 2.5 percent by weight on the stated basis.

The novelty of the present invention is based on the use of organosilicon compounds having nitrogen containing substituents bonded to silicon through Si—N bonding to reduce the surface tackiness resulting from air inhibition of the cure at the surface of the coating, molding or other cured form of the siloxane-peroxy systems described above. The SiN containing organosilicon compounds include organoaminosilanes as well as organoaminosilazanes and low molecular weight siloxanes having SiN groups in the polymeric molecule. These compounds are known in the art and can be prepared, for example, by reacting silanes of the general formula $R_mSiX_{4-m}$ where R is as defined above, X is a halogen atom and $m$ is 1, 2 or 3, with ammonia, primary amines or secondary amines. Reaction with amines is preferred.

The silane reactant is generally a chlorosilane because such silanes are most easily obtained in commercial quantities. Particularly useful are methyltrichlorosilane, dimethyldichlorosilane, trimethylchlorosilane, phenyltrichlorosilane, phenylmethyldichlorosilane, diphenyldichlorosilane, vinyltrichlorosilane, and vinylmethyldichlorosilane.

The amine reactant can be any primary or secondary amine, diamine or polyamine. There amines can be aliphatic, cycloaliphatic, or aromatic. Examples of operative amines include dibutylamine, ethylenediamine, cyclohexylamine, aniline, ethylamine, diethyltriamine, and dimethylamine.

The reaction between the organohalogenosilanes and the ammonia, primary or secondary amine to produce the desired organosilicon compound having SiN groups is known in the art. Procedures for carrying forward this reaction are shown, for example, in U.S. Pats. No. 2,462,635; No. 2,564,674; No. 2,579,417; No. 2,579,418; No. 3,187,030; and No. 3,143,514. It is preferred to employ sufficient ammonia or amine reactant to react with and replace all of the halogen atoms bonded to silicon in the silane reactant. The reaction is generally carried out at temperatures in the range from about —10° C. to room temperature (about 25° C.). If silane monomers are sought, the reaction should be carried forward under essentially anhydrous conditions, but in view of the operability of relatively low molecular weight polymers herein the exclusion of water from the reaction zone is not required. The reaction can be carried out in an organic solvent system wherein the solvent is inert to the reactants and reaction product. Useful solvents for this purpose include toluene, benzene, xylene, methylene chloride, 1,1,1-trichloroethane, perchloroethane, and other well-known commercially available organic solvents. The reactants are simply brought into contact with each other in the solvent with mixing to assure adequate contact between reactants. The reaction is considered to be completed when no more amine salt precipitates. The precipitated amine salt is separated by filtration and the organic solvent is removed by distillation, under reduced pressure if desired, and the reaction product is thus obtained.

The organosilicon compound having SiN groups can be applied to the surface of the molding, casting or coating prepared by heat curing the above-described alkenylsiloxane-peroxy composition. The organosilicon compound with SiN groups can also be applied to the molding, casting or coating prior to heat cure but with somewhat less effectiveness or employing somewhat larger amounts of the SiN compound to achieve the desired non-tacky surface. In general, from 0.001 to 0.05 g. of SiN containing organosilicon compound per square centimeter of cured siloxane resin surface will accomplish the desired results and best results are achieved with 0.002 to 0.01 g. per sq. cm.

The SiN organosilicon compound can be applied to the surface in any desired manner such as by spraying, brushing, dipping, rubbing, milling, flowing and so forth. It is usually desirable to employ an organic solvent as carrier for the SiN organosilicon compound and acetone as well as fluorocarbon compounds which serve as carrier and propellent in aerosol packages can be employed for this purpose.

As an alternative to applying the SiN organosilicon compound to the siloxane resin surface, one may incorporate the SiN organosilicon compound in the alkenylsiloxane-peroxy composition formulation. However, this will require the use of 0.2 to 5.0 percent by weight of the SiN organosilicon compound based on the weight of the alkenylsiloxane-peroxy compound composition hence larger quantities of the SiN organosilicon compound are required and this alternative is not preferred.

It is apparent from the known art that the mixture of alkenylsiloxane and peroxy compound can also contain incidental and commonly employed additives such as fillers or reinforcing agents including olefinically unsaturated pure organic compounds, as well as heat stabilizers, pigments and other additives. Examples of fillers and reinforcing agents include silicas such as fume silica, silica hydrogels, silica aerogels, precipitated silicas, quartz flour, fibrous magnesium silicate, asbestos powders, fibers, papers or tissues, zirconium silicate, titania, alumina, glass powder, glass frit, glass fiber, glass yarn, glass roving, glass fabric, glass tissue, glass microspheres, ground porcelain fragments (i.e. the so-called "fragment flour"), iron powder, aluminum powder and metal powders, fibers and flakes as well as metal oxide powders and flakes in general. The fillers are employed in well-known proportions with excellent results achieved employing 35 to 900 percent by weight of filler calculated on the weight of the organosiloxanes employed. Examples of olefinically unsaturated organic compounds which can be employed include divinylbenzene and triallylcyanurate. The olefinically unsaturated organic compound can be employed in proportions of from 5 to 20 percent by weight based on the mixture of organosiloxane, peroxy compound and olefinically unsaturated compound. In addition to the peroxy compound employed as a curing catalyst as noted above, the mixtures can contain further free-radical formers having lower activation temperatures and decomposing more rapidly than dicumylperoxide such as, for example, tert.-butylperoctoate and benzoyl peroxide.

The mixture of alkenylsiloxane and peroxy compound is cured according to known curing and hardening schedules but excellent results are achieved heating the mixture to a temperature in the range from 100° to 220° C. for a period of from 1 to 24 hours. Gradually increasing temperatures over a period of time are typically employed.

The method and materials of this invention find particular use for embedding electrical apparatus, impregnating electrical coils, transformers and other apparatus, in the preparation of glass fiber reinforced molded articles and in the preparation of release coatings based on siloxane polymers.

The following examples are included herein to assist those skilled in the art to better understand and practice this invention. The scope of the invention is delineated in the appended claims and is not limited by the examples.

EXAMPLE 1

(a) To a solution of 6.5 mol mono-n-butylamine and 10 l. methylenechloride, there was added dropwise 1 mol of methyltrichlorosilane while stirring. The temperature of the solution was held at +10° C. After the chlorosilane had been added, the mixture was stirred for another two hours at room temperature. It was then filtered off from the amino salt. The methylene chloride and excess amine was distilled off from the filtrate excluding atmospheric moisture. The residue was a fluid consisting essentially of methyl-tris-(n-butylamino)-silane.

(b) A linear organopolysiloxane consisting essentially of 34 mol percent diphenylsiloxane units, 25 mol percent dimethylsiloxane units, 34 mol percent vinylmethylsiloxane units, 4 mol percent phenylmethylsiloxane units and 3 mol percent trimethylsiloxane units having a viscosity of about 5,000 cs. at 25° C. was mixed with 2 percent by weight calculated on the weight of the organopolysiloxane of dicumylperoxide at 80° C. and the mixture was poured into a square aluminum box with an inside measurement of 4 cm. by 4 cm. by 1.5 cm. open at the top and used as a mold. The mold filled with this material was left to stand for 6 hours in an air circulating oven running at 150° C. A solid glass-like molded article was formed. The surface of the molded article which was exposed to the air during the curing was very tacky. This tacky surface was coated with 0.5 ml. of a solution of 1 part by weight of the fluid consisting essentially of methyltris-(n-butylyamino)-silane prepared in (a) above in 3 parts by weight acetone. Within 10 minutes the acetone had vaporized and the surface was completely tack free. A piece of filter paper applied with a finger fell from the surface by itself without leaving impressions or fibers on the surface of the molded article.

EXAMPLE 2

(a) To a solution of 5.5 mol diethylamine in 10 l. of water saturated toluene, there was added dropwise 1 mol of phenyltrichlorosilane while stirring. The temperature of the solution was kept at +10° C. After the chlorosilane had been added, the mixture was stirred for another two hours at room temperature. It was then filtered off from the amine salt and from the filtrate the toluene was distilled off at 12 mm. Hg absolute and a heating bath temperature of 50° to 80° C. The residue was a fluid consisting of a low polymeric phenyldiethylsilazane.

(b) A branched organopolysiloxane consisting of 30 mol percent diphenylsiloxane units, 5 mol percent monophenylsiloxane units, 20 mol percent dimethylsiloxane units, 5 mol percent monomethylsiloxane units, 25 mol percent vinylmethylsiloxane units, 10 mol percent monovinylsiloxane units and 5 mol percent trimethylsiloxane units, with a viscosity of 150,000 cs. at 25° C. was mixed with 2 percent by weight calculated on the weight of the organopolysiloxane of dicumylperoxide at 80° C. and poured into the form described in Example 1. The mold filled with this material was heated for 3 hours at 150° C. followed by 3 hours at 200° C. A solid, rigid molded article was formed. The surface of the molded article, which was exposed to the air during the curing, was still very tacky. The molded article was then dipped into a solution of 1 percent by weight of the low polymeric phenyldiethylsilazane prepared in (a) above in 4 parts by weight acetone for 30 seconds. Within 10 minutes the acetone had vaporized and the surface was completely tack free. Upon rubbing with a piece of cotton, no fibers adhered to this surface.

EXAMPLE 3

(a) The procedure according to Example 1(a) was repeated with the alternation that in place of the 6.5 mol butylamine, 6.5 mol monocyclohexylamine was used. A fluid was obtained consisting essentially of methyltris-(cyclohexylamino)-silane.

(b) An organopolysiloxane consisting of 20 mol percent diphenylsiloxane units, 10 mol percent phenylmethylsiloxane units, 15 mol percent dimethylsiloxane units, 30 mol percent vinylmethylsiloxane units, 4 mol percent monophenylsiloxane units, 3 mol percent monomethylsiloxane units, 8 mol percent monovinylsiloxane units, and 10 mol percent trimethylsiloxane units having a viscosity of 15,000 cs. at 25° C. was mixed with 400 percent by weight calculated on the weight of the organopolysiloxane of zirconium silicate and 2 percent by weight calculated on the weight of the organopolysiloxane of dicumylperoxide at 80° C. and poured into a form such as described in Example 1. The form filled with this material was heated for 3 hours at 150° C. followed by 3 hours at 180° C. and 3 hours at 210° C. A solid rigid molded article was formed whose surface exposed to the air was still tacky. This surface was then wiped off with a nonlinting cloth which had been saturated with a solution of 1 part by weight of the fluid consisting essentially of methyltris - (cyclohexylamino) - silane prepared in (a) above in 3 parts by weight acetone. Within 10 minutes acetone had vaporized and the surface was completely tack free.

EXAMPLE 4

(a) The procedure according to Example 1(a) was repeated with the alteration that in place of the 1 mol methyltrichlorosilane, 1.5 mol dimethyldichlorosilane was used. A fluid was obtained consisting essentially of methylbis-(n-butylamino)-silane.

(b) An organopolysiloxane of the type described in Example 3 was mixed with 2 percent by weight calculated on the weight of the organopolysiloxane of dicumylperoxide and 2.5 percent by weight calculated on the weight of the organopolysiloxane of the fluid consisting essentially of methylbis-(n-butylamino)-silane at 80° C. prepared above and poured into the form as described in Example 1. The form filled with this material was heated for 4 hours at 150° C. A solid rigid molded article was obtained whose surfaces were completely tack free. No finger marks remain on the surface of the article exposed to the air during the curing.

That which is claimed is:

1. A method for preparing organopolysiloxane resin coatings and molded articles by heat curing at 100 to 220° C. for 1 to 24 hours a mixture of (a) 100 parts by weight of an organopolysiloxane resin of the general unit formula $$R_nSiO_{\frac{4-n}{2}}$$

where each R is a monovalent radical selected from the group consisting of hydrocarbon radicals, halogenohydrocarbon radicals and cyanoalkyl radicals, $n$ has an average value of 0.9 to 2.4, at least one R per 10 silicon atoms being an alkenyl or cycloalkenyl radical, said organopolysiloxane having a viscosity at 25° C. of from 200 to 20,000 cs., (b) 0.5 to 3.0 parts by weight of an organic peroxide curing agent and (c) 0.2 to 5.0 parts by weight of an organoaminosilane or an organoaminosilazane wherein the amino groups are bonded to silicon through SiN linkage and the organic substituents bonded to silicon are monovalent hydrocarbon radicals.

2. The method of claim 1 wherein the organopolysiloxane is a copolymer consisting essentially of (a) 0.1 to 10 mol percent of units of the formula $R'_3SiO_{1/2}$ where R' is a methyl or phenyl radical, (b) 20 to 99.9 mol percent of units of the formula $R''_2SiO$ where R'' is a vinyl methyl or phenyl radical and (c) any other units present being of the formula $R''SiO_{3/2}$ where R'' is as above defined, said organopolysiloxane having a vinyl to silicon ratio in the range from 1/10 to 1/1.

3. The method of claim 2 wherein the organic peroxide curing agent is selected from the group consisting of dicumylperoxide, di-tert.-butylperoxide, cumene hydroperoxide, 2,2-bis(tert.-butylperoxide)butane, tert.-butylperlaurinate, tert.-butylperbenozate, and tert.-butylhydroperoxide.

4. The method of claim 1 wherein the organosilicon compound having SiN groups is prepared by reacting a hydrocarbylchlorosilane of the formula $R_mSiCl_{4-m}$ where R is a monovalent hydrocarbon radical and $m$ is 1, 2 or 3 with at least 4-m moles of ammonia, primary aliphatic or aromatic amine or polyamine or secondary aliphatic or aromatic amine or polyamine whereby substantially all of the chlorine atoms are removed from the silicon atom.

References Cited

UNITED STATES PATENTS

| | | | |
|---|---|---|---|
| 3,243,404 | 3/1966 | Martellock | 260—825 |
| 3,219,726 | 11/1965 | Bailey et al. | 260—825 |
| 3,524,900 | 8/1970 | Gibbon et al. | 260—825 |
| 3,527,728 | 9/1970 | Gibbon et al. | 260—825 |

SAMUEL H. BLECH, Primary Examiner

U.S. Cl. X.R.

117—138.8 R, 161 ZA; 260—37 SB, 46.5 E 46.5 U